(12) United States Patent
MacGregor

(10) Patent No.: US 8,624,725 B1
(45) Date of Patent: Jan. 7, 2014

(54) ENHANCED GUIDANCE FOR ELECTRONIC DEVICES HAVING MULTIPLE TRACKING MODES

(75) Inventor: Christopher S. A. MacGregor, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 210 days.

(21) Appl. No.: 13/241,031

(22) Filed: Sep. 22, 2011

(51) Int. Cl.
*G08B 21/00* (2006.01)

(52) U.S. Cl.
USPC ............... 340/539.13; 455/404.2; 455/456.1; 342/450

(58) Field of Classification Search
USPC ............. 340/539.13, 988, 995.1; 455/414.2, 455/404.2, 456.1; 342/450, 451, 453, 457, 342/459; 701/23, 408
See application file for complete search history.

(56) References Cited

U.S. PATENT DOCUMENTS

2009/0318168 A1* 12/2009 Khosravy et al. .......... 455/456.3

* cited by examiner

*Primary Examiner* — Jeffrey Hofsass
(74) *Attorney, Agent, or Firm* — Novak Druce Connolly Bove & Quigg LLP

(57) ABSTRACT

The location of an electronic device can be tracked and updated in order to provide a user of the device accurate directions from the user's current location to a target location, for various types of environments. Upon detecting a trigger (e.g., detecting a QR code or detecting an access point signal), an example device can switch from using a first type of positioning element (e.g., GPS) to a second type of positioning element (e.g., using accelerometers, QR codes, etc.) in determining the user's current location. By using the appropriate type of positioning element for each environment, the device may determine the user's current location more accurately. The device may provide an overlay (e.g., arrows) for displaying the directions over images captured from the user's surroundings to provide a more realistic and intuitive experience for the user.

28 Claims, 8 Drawing Sheets

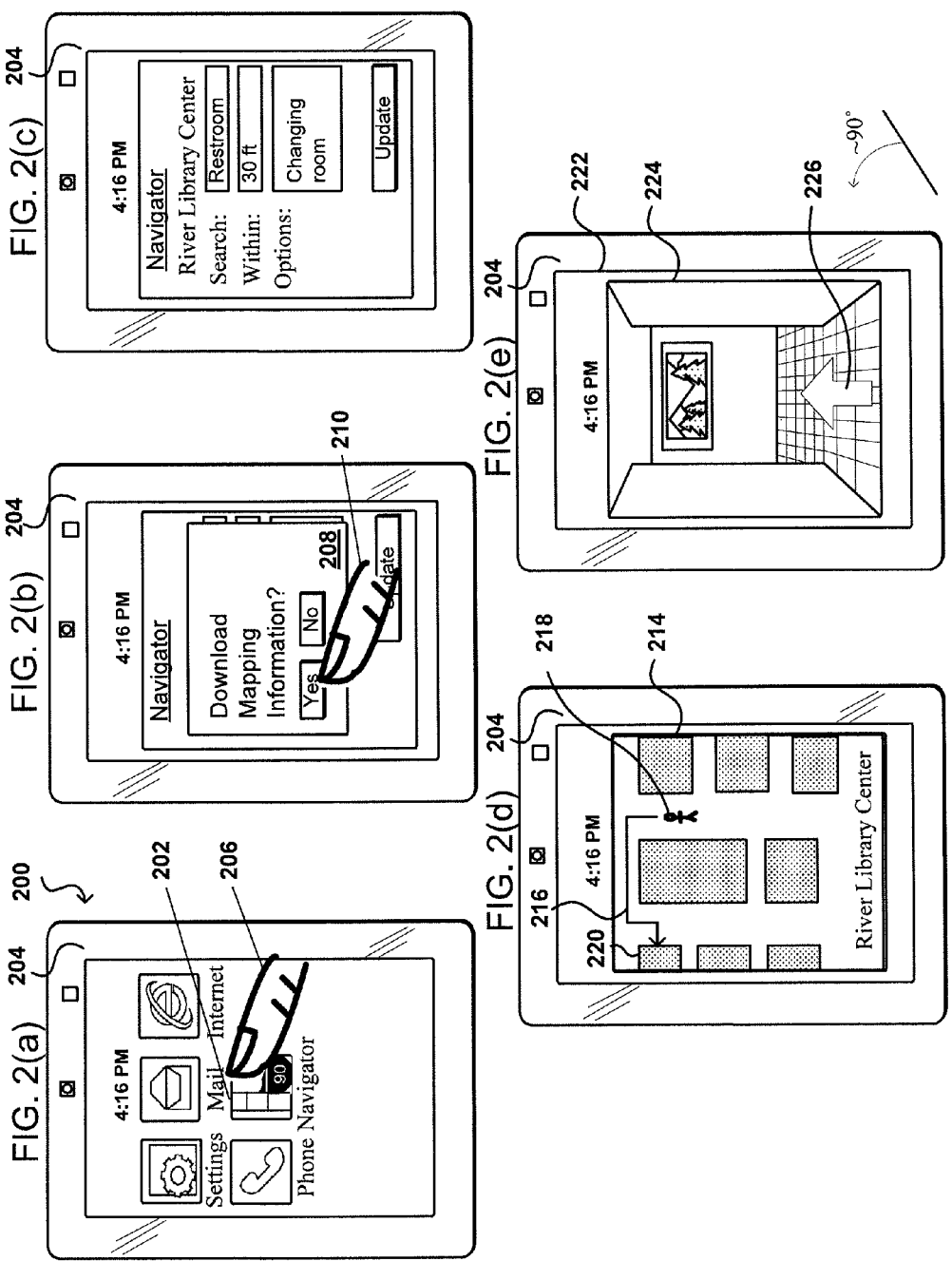

ENHANCED GUIDANCE FOR ELECTRONIC DEVICES HAVING MULTIPLE TRACKING MODES

BACKGROUND

People are utilizing portable electronic devices for an increasing number and variety of tasks. Oftentimes, a user of an electronic device may want to obtain information regarding objects, persons, and/or locations in the surrounding areas. For instance, the user may want to obtain directions from the user's current location to a target location. However, it can be difficult to obtain accurate directions in certain situations. Because a device relying on a conventional global positioning system (GPS) can only approximate its location to +/−20 meters, the device may not be able to effectively guide a user situated inside a limited space. Further, the accuracy of GPS determinations typically drops off when the user is inside a building, such that GPS directions can be even less useful trying to get from one location to another location within the building. Not only would it be difficult for the device relying on GPS to accurately determine the initial location of the device, the device cannot accurately track its position and orientation as the user moves about. Further, in some instances, the maps stored on the device may be out-of-date or incorrect, thereby increasing the overall unreliability of conventional methods.

In addition to the unreliability of the directions provided by the devices while using GPS, directions are currently provided to users in a way that assumes that a user of the device has some knowledge of the area and their position and orientation within it. For example, a device may show a user that she is currently located on a certain street, but fail to show whether she is facing east or west. This hardly intuitive interface makes it difficult for the user to know which direction to proceed and tends to force the user to engage in guesswork before getting on the right path.

BRIEF DESCRIPTION OF THE DRAWINGS

Various embodiments in accordance with the present disclosure will be described with reference to the drawings, in which:

FIGS. 2(a)-2(e) illustrate an example situation of a user of an electronic device activating a navigation feature that guides the user to a particular location in accordance with various embodiments;

DETAILED DESCRIPTION

Figure 1A:
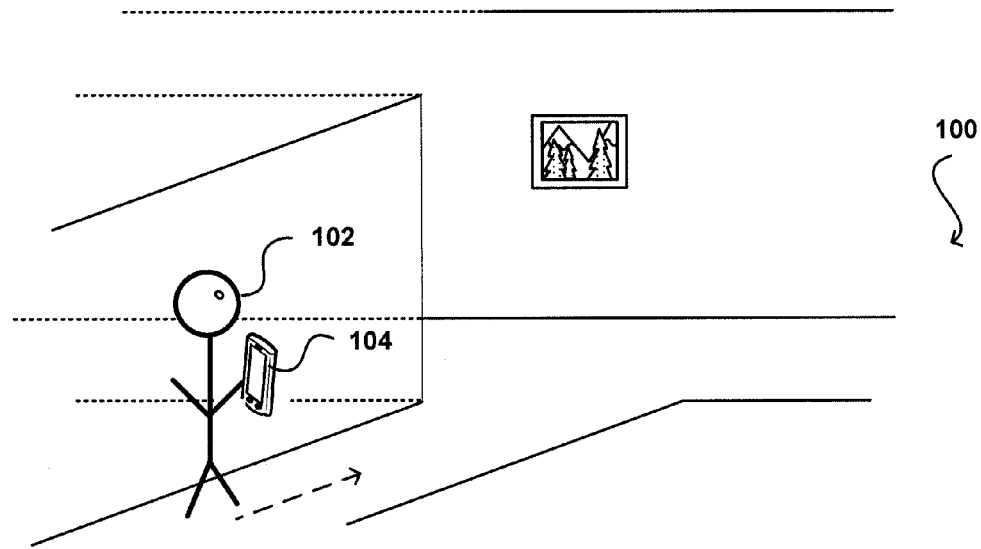
FIGS. 1(a)-1(c) illustrate example situation of a person using an electronic device to obtain information on persons, objects, and/or areas captured by the electronic device in accordance with various embodiments.

Systems and methods in accordance with various embodiments of the present disclosure may overcome one or more of the aforementioned and other deficiencies experienced in conventional approaches to presenting guidance information on an electronic device (e.g., desktop computer, laptop computer, tablet computer, smartphone, media player, personal digital assistants (PDAs), electronic book reading devices, etc.). In particular, various embodiments enable the electronic device to obtain and display information (e.g., directions to a particular location) regarding surrounding objects, persons, and/or locations to a user of the electronic device in an intuitive manner. For instance, the electronic devices of some embodiments may provide a three-dimensional view of the user's surroundings including superimposed symbols (e.g., arrows) that provide directional guidance.

In order to present information regarding a user's surroundings, the device of some embodiments determines the user's current location. In some embodiments, such as where greater precision is not needed, the device may determine the user's current position by using the GPS receiver on the device or a triangulation of cellular signals. Some embodiments enable the device to accurately determine its current location by using other mechanisms, either separately or in conjunction with each other and/or a GPS receiver, for example, such mechanisms may include wireless access points, quick response (QR) codes, radio-frequency identification (RFID), near-field communication (NFC), orientation determining elements (e.g., accelerometers, gyroscopes, compasses) on the device, triangulation or similar combinations of two or more instances of any combination of the above, etc. By enabling the device to accurately determine and track its current location, the device may provide accurate directions and orientation information to its user, even when the device is indoors or otherwise unable to obtain conventional tracking signals.

The device of some embodiments uses different location-determining elements (e.g., wireless access points, QR codes) to accurately determine the current location of the device. Although in instances where the user is driving from a building to another, the device may use GPS to provide directions that are sufficiently accurate to the user, GPS may not provide enough precision when the user is trying to get from one location to another within a building or in high-density urban areas, etc. Some embodiments may provide a trigger (e.g., a QR code, an NFC tag, a broadcasted signal) that enables the device to switch from detecting one or more types of signals (e.g., GPS signals) to detecting other types of signals (e.g., wireless access point signals) in determining its current location.

By enabling the device to use appropriate location-determining mechanisms in certain situations, the device of some embodiments may determine and present accurate position, orientation, and/or directional guidance to the user. In some embodiments, the device may present additional information regarding the determined current location, current orientation, the target location, and/or objects, areas, and persons along the way. For example, in addition to directions to a particular location, the device may present history and background information on the current/target location and information on objects and/or persons in the current environment.

Some embodiments provide a graphical user interface (GUI) for a navigation application that provides information, such as directions, to a user. The GUI may display an overlay superimposed over a display generated from surrounding images or video captured by an electronic device. The overlay of some embodiments displays information relating to objects, persons, and/or locations within the surrounding environment. In some embodiments, the overlay displays directional guidance that enables the user to follow the directional guidance in an intuitive manner. For example, the GUI may display directional arrows overlaid on captured images of the floor of the surrounding to help direct the user to a particular conference room inside an office building.

Various other applications, processes and uses are presented below with respect to the various embodiments.

Figures 1B, 1C:
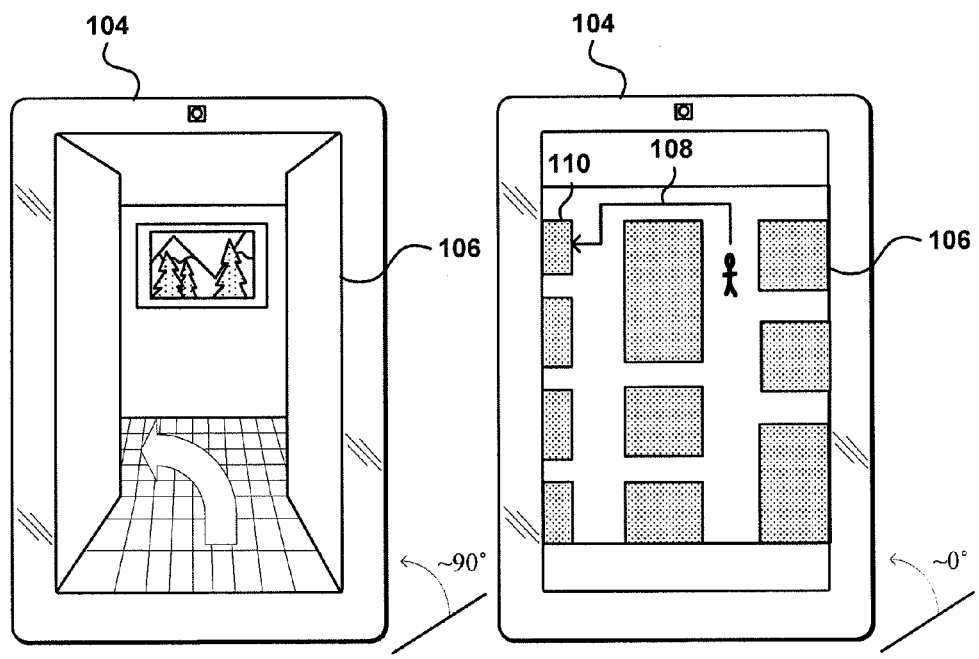

FIGS. 1(a)-1(c) illustrate an example situation 100 of a person 102 using an electronic device 104 to obtain information on persons, objects, and/or areas captured by the electronic device. In some embodiments, the electronic device captures images of the user's surrounding and provides information regarding those objects and persons in the user's surrounding. For instance, the device may provide background information regarding a person captured and identified (e.g., using image recognition) by the user's device in the vicinity. Some embodiments enable the device to retrieve mapping information regarding a particular area (e.g., a shopping center, an office building) and use the mapping information to determine and present related information on objects, persons, and areas close to the user's current location.

In some embodiments, the mapping information may include location information regarding various objects, persons, and areas within the particular area. For instance, the location information regarding areas such as the different conference rooms, restrooms, offices within a particular office building may include the geographical coordinates of each of these areas. The mapping information may also include other information such as profiles of persons, usage of objects, and historical significance of each of the areas, etc.

Upon obtaining access to the mapping information (e.g., by retrieving the information from a remote server, by accessing a map of the particular area stored locally on the device), the device may identify the user's current location, determine the desired information (e.g., information on a particular object in the vicinity, directions to a particular location within the area) and present the information to the user. In some embodiments, the device captures image information (e.g., video or at least one still image) from the user's surrounding to generate a display that includes images of the user's surrounding and an overlay that provides the information on, or directions relative to, the persons or objects in the user's surroundings.

FIG. 1(a) illustrates a user 102 using an electronic device 104 to obtain information on persons, objects, or areas in the user's surroundings. As mentioned, the device may determine the user's current location and use the mapping information to provide the desired information (e.g., directions to a particular location within the area) to the user. The device may capture one or more images from the user's surrounding environment to generate a two- or three-dimensional image of the user's surroundings.

The device might utilize at least one camera or other such imaging element (e.g., charge-coupled device (CCD), a motion detecting sensor, an infrared sensor, etc. part of the device or communicatively coupled to the device) that is either on the device or on another device (e.g., using imaging elements on other users' devices, using cameras in fixed locations, etc.) to capture image information over a range of angles around the device. For example, the device may capture information over a full 360° range around the device. In some embodiments, the device may capture the surroundings with at least two cameras of the device to construct a two-dimensional or three-dimensional view of the user's surroundings.

As described, depending on the orientation and the angle at which the user is holding the device, as well as the direction at which the user is pointing the device, the device may generate different views of the user's surroundings. In some embodiments, the device may display a planar view or bird's eye view of the user's surroundings, similar to how conventional two-dimensional maps are displayed. Some embodiments may generate a display that includes three-dimensional images captured from the surroundings. In some instances, the device displays images in a way as if the user were looking through a window, enabling the user to see an augmented reality of the user's surroundings on the display screen of the device. In this example, the user 102 is holding the device 104 with the display element of the device facing the user and the back of the device facing a hallway, enabling the device to capture images using the side and back cameras of the device in order to present a virtual reality of the user's perspective of the environment.

FIG. 1(b) illustrates an example of what the user of the electronic device might see on a display screen 106 of the device 104 when the user is holding the device upright with the display screen substantially facing the user and another face of the device facing a hallway in some embodiments (i.e., held substantially perpendicular to the floor). By holding the device in an upright manner in at least some embodiments, the device can act like a window whereby the user can see objects "through" the device using images captured from the one or more cameras of the device (e.g., the side and back cameras). As shown, the device displays a three-dimensional virtual reality of the surrounding environment that the user sees (i.e., a 180° range around the user from one side to the other). As illustrated in FIG. 1(b), however, the device also can overlay graphical elements or directional information over the displayed image information as discussed later herein. In such a situation, the user can effectively have directions presented "over" the user's current view, providing easily understandable directions based on the user's current environment.

FIG. 1(c) illustrates what the user of the electronic device 104 sees on the display screen 106 of the device when the user is holding the device substantially parallel to the floor (e.g., within a threshold angle). In some embodiments, the device displays a two-dimensional view (e.g., bird's eye view) of the user's location within the area and the desired information (i.e., directions to a particular location within the area). Some embodiments display the two-dimensional view when the device is held at certain angle (e.g., within 45° range from the floor). In this example, the display screen 106 displays a two-dimensional view of an area (e.g., an office) indicating the user's current location and directions 108 to a particular location 110 (e.g., a restroom).

In some embodiments, the device displays the three-dimensional view when the device is held beyond a threshold angle (e.g., the device is held at an angle exceeding 45° from being parallel to the floor). The device may alternate between the two- and three-dimensional view of the user's surroundings as the user holds the device differently (e.g., displaying a three-dimensional view when the device is tilted at an angle where the back camera(s) of the device may capture the user's surroundings and displaying a two-dimensional view when the device is held within a threshold angle (e.g., +/−20°) where the back camera(s) is substantially facing the floor). In some embodiments, the device may not switch between the two views and continue to display a three-dimensional view of the user's surrounding regardless of the angle of the device (e.g., by enabling the device to capture the surrounding images using cameras that are on the rim or the side of the device as opposed to the back of the device when the device is tilted beyond a certain angle).

While the device may display information regarding various objects and persons within a particular area, some embodiments enable the device to display directional guidance to a user of the device in an intuitive manner. FIGS. 2(a)-2(e) illustrate an example situation 200 of a user of an electronic device 204 activating a navigation feature that enables the device to guide the user toward a location in an intuitive manner. In some embodiments, the user of the electronic device may activate the feature upon entering a premise (e.g., a shopping mall, an office building, a hospital) by manually selecting to activate the feature (e.g., through a selectable user interface item, through a toggle of a component on the device). In other embodiments, a device might automatically activate this mode or application when detecting an element associated with a location, such as a QR code at the entrance of a building or base station signal from within a location. Some embodiments enable the user to download mapping information prior to approaching the premise (e.g., at home, in the parking lot of the shopping center), or upon entering the premise, through a network connection (e.g., via wireless Internet, intranet). If the device communicates with a WiFi hotspot, for example, the device can determine the appropriate mode by detecting the hotspot and also obtain the necessary mapping information from that hotspot if not already stored on the device. In at least some embodiments, the mapping information can also be updated as necessary when communicating with one of the hotspots associated with a location.

As shown in FIG. 2(a), the user 206 has manually activated the navigation feature by selecting a selectable user interface item 202 (e.g., a button) on the device 204. The selectable user interface item may be an application icon in some embodiments. Some embodiments enable the user to activate the navigation feature through a preference setting of the device. In some embodiments, the user manually activates the navigation feature, enabling the device to detect and receive mapping information when the navigation feature is activated. Some embodiments enable the device to receive the necessary information (e.g., mapping information) prior to activating the feature. In such instances, the device then uses the necessary information when the navigation feature is later activated.

FIG. 2(b) illustrates that upon activation of the navigation feature, the device 204 of some embodiments downloads mapping information 208 of the premise (e.g., through a network connection). As described above, some embodiments may download the mapping information prior to activating the navigation feature. Some embodiments push mapping information to the user's device upon an event. In one example, a remote server may push a hospital map and additional information regarding the hospital to a user upon the user making a doctor's appointment. In another example, some embodiments may push shopping mall information (e.g., map of the shopping center, advertisements from stores within the shopping center, operating hours) to the user's device when the user approaches the shopping mall's parking lot (e.g., by detecting the user's device through a network connection).

Some embodiments enable the device to download the mapping information by accessing a cloud server that includes the mapping information (e.g., through a network connection, when directed to a network address upon scanning a QR code, an NFC tag, a broadcast WiFi signal, etc.). In some embodiments, the device may access the information at the cloud server so that the device needs not download the information onto the device itself.

In various embodiments, mapping information for a particular area (e.g., a shopping mall, an office building, a school, a city) may include geographical coordinates of certain objects or locations within the particular area, the location of items with respect to other items within the particular area (e.g., map of the conference rooms with respect to office individual's mobile devices), etc. In some embodiments, the mapping information also includes additional information for the particular area, such as the company directory for a particular company or descriptions of each section within a museum, etc.

As mentioned, mapping information for a particular area (e.g., a shopping mall, an office building, a school, a city) may include location information of objects (e.g., mobile devices, printers/copiers) and locations (e.g., bathrooms, kitchens, offices, conference rooms, etc.) within the particular area (e.g., geographical coordinates of objects and locations or the position of certain items with respect to other items). For example, mapping information of a shopping center may identify the location of different stores, the bathrooms that are in the vicinity, the food courts, the ATMs, etc. In another example, mapping information of an office building may identify the location of each person's office, the conference rooms, the bathrooms, the kitchens, the vending machines, a location of a conference room with respect to various offices or mobile devices, etc.

In addition to location information, mapping information may include additional information regarding objects and persons within the area. For instance, the mapping information may include information such as the operating hours of the different stores within the shopping center, the types of food items that are within a vending machine, the company directory for a particular company, descriptions of each section within a museum, etc. Further, in some embodiments, the mapping information may include predetermined best route from one location to another.

In some instances, the mapping information is created and maintained by an individual or an organization that has an interest in providing users (e.g., customers of a shopping center, visitors of an office building) an accurate and updated version of the mapping information. In some embodiments, the mapping information is constantly updated "in the cloud" so that users may obtain access to updated information through a network connection whenever desired. For instance, the mapping information of some embodiments includes location information of multiple mobile devices within a particular area. By having access to mapping information that is updated in real-time enables a user to be able to monitor the location and constant movement of multiple mobile devices.

In some embodiments, prior to having access to mapping information, the device requests for user permission in order to be able to download or access the mapping information (e.g., by presenting to the user a prompt for confirmation). Some embodiments present this request upon a trigger, such as when the user is within a threshold distance of a particular premise (e.g., 20 ft. radius of around the convention center), or when the user's device detects a locally originating trigger such as a WiFi broadcast signal announcing the availability of mapping information. Some embodiments automatically download or obtain access to mapping information (e.g., through a network connection) upon the user's activating the navigation feature. In such instances, the device may detect and/or actively retrieve the mapping information upon the activation of the feature.

As shown in FIG. 2(b), the device 204 presents a request 208 as to whether the user 210 would like to download the mapping information. Upon receiving confirmation to download the mapping information (e.g., by selecting a user interface item), the device may download the information from a remote or on-premises server (e.g., through a network connection). Some embodiments enable the device to obtain access to the mapping information by having the device scan a QR code, by enabling the device to obtain the information through another NFC device, etc. As mentioned above, the user may also obtain access to the mapping information by accessing a remote or local server without having to download the mapping information onto the device.

FIG. 2(c) illustrates that upon activating the navigation functionality, the user of the device may request for navigation information to a particular person, location, or object. In some embodiments, the device provides a user-editable entry field that enables the user to input a specific location, object, or person to which the user would like to be directed. The user may then input (e.g., via keystroke, via a cursor selection) the desired target destination, the person whom the user wants to locate, and/or the object to which the user would like to have access. Some embodiments may present the user with a menu of categories of destinations, objects, and/or people, allowing them to conveniently select the mapping target without entering text. Some embodiments enable the device to determine the location of the person, location, or object and the directions by using the mapping information.

In some embodiments, the device determines the location of a person by locating the person's mobile device (e.g., the person's smartphone). Some embodiments use the mapping information that is updated in real-time to find the location of the person. In some embodiments, the device may use an algorithm to determine the location of the person (e.g., by factoring the length of time that the device has been immobile and within the person's designated office).

In this particular instance, the user has requested to search for the nearest restroom (i.e., by inputting the request into a search box 212). The device of some embodiments performs a search and presents a list of search results from which the user may select. In some embodiments, the device determines a best route by finding the path between the two points that has the shortest distance. Some embodiments take various parameters into account (e.g., traffic, the number of gates, the speed limit if any, the number of floors one must travel, within a particular distance, etc.) in determining the best route. The device may factor in the different parameters when determining the best route and display the different options to the user along with the estimated times and distances. The user may then select which route to take by assessing the options.

Some embodiments may automatically select the best route without having the user select from a list of search results (e.g., when one route is significantly better than the others). In some instances, the user may narrow the search results by indicating personal preferences (e.g., not having to walk outdoors, taking local streets instead of the freeway, taking a scenic route, taking a route that does or does not pass by certain locations, objects, and/or persons) either before or after the user's initial search request.

In some embodiments, the device does not permit the user to make a general search, but displays a list of options from which the user may select. The list of options (e.g., locations, objects, and/or persons) presented to the user may vary in accordance with the level of clearance granted to the user (e.g., by an administrator of the premise). The administrator of a premise may designate different clearance levels for different persons. For instance, a company may only want to disclose information that is not considered confidential (e.g., the location of the bathrooms, the location of selected conference rooms, etc.) to visitors whereas employees may receive mapping information that may provide more information regarding the premise (e.g., the lab location where certain experiments are being performed, the office location of high profile personnel within the building).

FIG. 2(d) illustrates that upon a request for directions to a particular location (e.g., the nearest restroom), the device 204 displays a two-dimensional map 214 that shows an overview of the path 216 in getting from the user's current location 218 to the target location 220. As shown in this figure, the device displays an overview of the route that takes the user from the user's current location to a target location. The overview map view enables the user to obtain an overall sense of what the route encompasses (e.g., the number of turns, the total distance, the number of elevators and escalators the user needs to ride in order to arrive at the target location, the offices that the user may walk pass). As shown, the overview map indicates that the user may need to take two turns to reach the target location (i.e., the restroom in this case).

Further, in addition to directions to the target location, the device may display additional features (e.g., in the form of additional selectable user interface items) that may be activated by the user (e.g., by selecting a selectable user interface item), such as the option to display the location of other mobile devices within the premise. The user of the device may use this information to assess the route options and determine whether to take other routes in order to bypass or to intercept or encounter certain things or persons that the user may otherwise encounter along the way. There may be functions that enable the user to adjust the current route if desired.

FIG. 2(e) illustrates the beginning of the navigational guidance as the user holds the device 204 such that the display element 222 of the device is substantially perpendicular to the floor. In some embodiments, the device displays three-dimensional directional guidance when the device is tilted beyond a threshold angle from the display element being parallel to the floor to being perpendicular to the floor. In this example, the device displays a three-dimensional view 224 of the user's surroundings along with an overlay that includes a symbol (e.g., an arrow 226) for directing the user toward a particular direction. Some embodiments display three-dimensional directional guidance despite the orientation of the device. The display including the user's surrounding changes as the user tilts the device differently in some embodiments.

Figure 3:
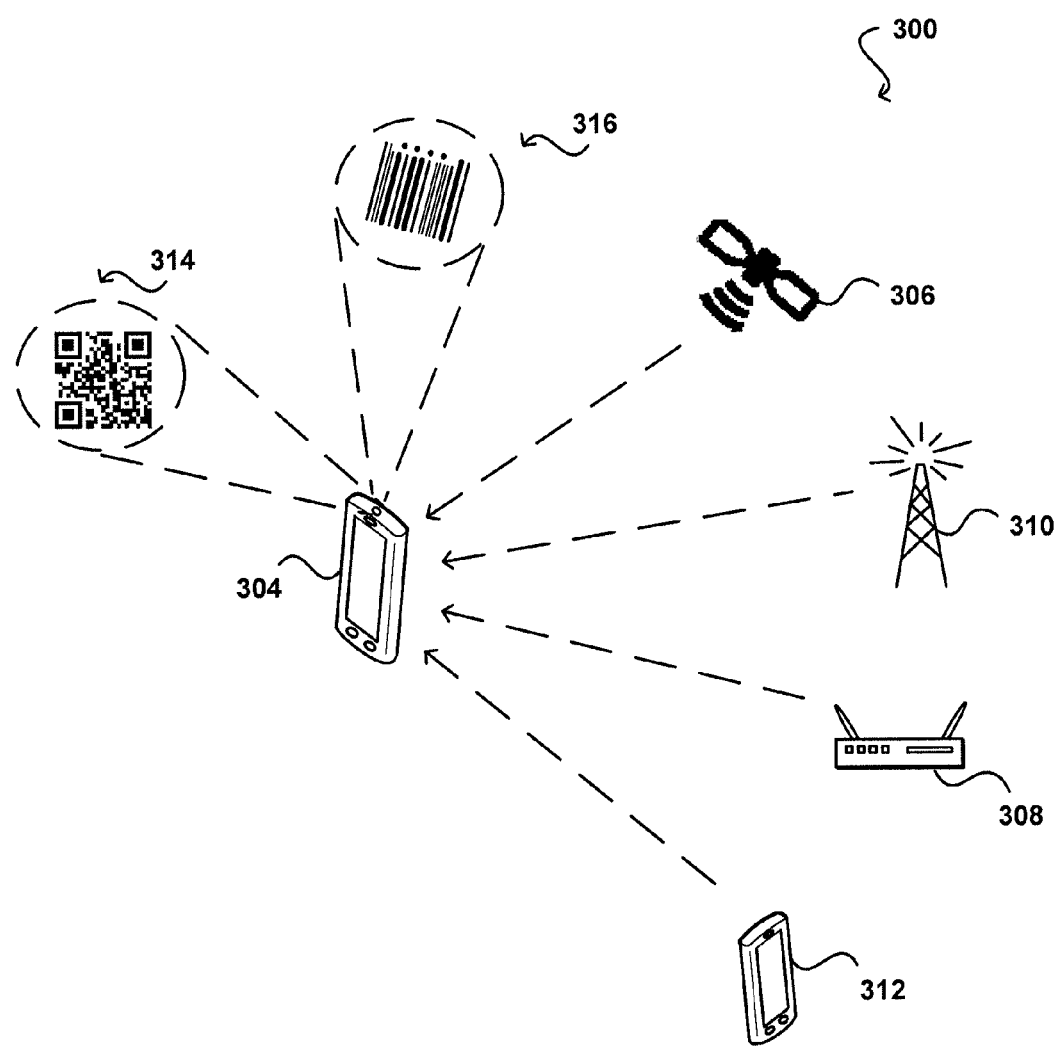
FIG. 3 illustrates the usage of various mechanisms in determining the location of an electronic device in accordance with various embodiments.

FIG. 3 illustrates embodiments of usages 300 of various location detection mechanisms in determining the location of an electronic device 304. By being able to accurately determine the current location (e.g., the geospatial coordinates) of the electronic device, the device may provide accurate navigation information to the user (e.g., the distance and time from the current location the target destination). In some embodiments, the device may use different mechanisms to signal the device an appropriate mode (e.g., indoor mode, outdoor mode) in which the device should operate. By enabling the device to operate in the proper mode, the current location of the device may be more accurately tracked in some embodiments. For instance, by enabling the device to detect signals from wireless access points or similar devices (e.g., femtocells) and performing signal triangulation when the device is in an indoor location (e.g., within an office building, within a gym), the location of the device may be more accurately determined as opposed to using GPS to determine the location.

As mentioned above, the device of some embodiments receives a user request for directions to a particular object, person, or location. The device may then use the mapping information to locate the target destination and determine the directions from the device's current location to the target destination. The device of some embodiments uses one or more mechanisms to determine the location of the electronic device in order to provide the user with accurate directions from the user's current location (i.e., corresponding to the device's current location) to the target destination.

In some embodiments, the electronic device 304 uses a location-determining element such as a GPS receiver (e.g., in the device or wirelessly connected to the device through a Bluetooth® connection) to determine the position or location of the electronic device (e.g., by receiving and analyzing signals from satellites 306). Although in some situations (e.g., when determining what street the user is currently located, when determining which building entrance the user has taken, etc.) using GPS enables the user to obtain a fairly accurate and/or precise location information of the user's current position, it may be difficult in some situations (e.g., when the user is in a high density area) to accurately determine the user's location since the accuracy level is only up to +/−20 meters in some instances. The device of some embodiments may then switch to using other location and/or orientation determining elements of the device such as accelerometers, gyroscopes, electronic compasses, etc. to track the user's movement.

In some embodiments, the device uses inertial navigation sensors such as accelerometers and gyroscopes to track the user's movement and determine the user's position while indoors (e.g., use a software application to extrapolate the device's current location). Due to the drifts inherent to the system, the error in the estimate increases as the user's moves. Some embodiments may then use other mechanisms (e.g., signal triangulation, QR codes, etc.) to update or reposition a more accurate estimate of the current location.

Some embodiments utilize wireless access points (e.g., wireless routers 308, femtocells, other mobile devices 312, location beacons (i.e., devices whose sole or primary purpose is to broadcast a signal to be used in location and orientation determination), etc.) that are distributed throughout the indoor location to determine the user's location. In some embodiments, the location of the device is determined by triangulating the signals received from access points located in different parts of the indoor location. By detecting and analyzing the signals from access points, some embodiments may identify and verify the location of the user's device. The access points used in this manner may be all of the same type, or in some embodiments the device may simultaneously incorporate information from different types of sources or signals, combining the information via triangulation or other means. Some embodiments enable the device to determine its location by establishing a communication channel with other electronic devices (e.g., other smartphones) in a vicinity of the device.

Some embodiments determine the user's location using other mechanisms such as QR codes 314. The user may scan QR codes that contain location information to obtain an identifier, which the device may use to retrieve location information (e.g., by mapping the identifier to a corresponding location information in a lookup table). In some embodiments, the device may recognize QR codes (e.g., using a software application) that provide information regarding the user's location. Some embodiments may similarly obtain an identifier through scanning a barcode 316 and determine location information using the obtained identifier.

The device of some embodiments may also determine location information by identifying surrounding objects (e.g., through image recognition and analysis) or by receiving audio signals (e.g., digital watermarks) from the environment. Some embodiments may match the identified objects in the user's surrounding (e.g., number on a door) with information in the mapping information to determine the user's current location. Different embodiments may use different mechanisms to determine and verify the user's location (e.g., RFID tags, NFC tags/devices, signal strength triangulation, devices that broadcast signals for this particular purpose, etc.). Some embodiments may use one or more of these mechanisms in conjunction to increase the precision in identifying the user's location.

As mentioned above, the various mechanisms may also be used to signal to the device the mode (e.g., indoor mode, outdoor mode) in which the device should operate. Upon detecting a signal from a particular mechanism (e.g., a QR code provided at a shopping mall concierge, an NFC device at the grocery store entrance, a signal broadcasted using a wireless access point), the device may switch from operating in one mode (e.g., using GPS signals to determine the device's location) to another (e.g., using QR codes, NFC tags, WAP signals, or orientation determining elements such as the device's accelerometer, to determine the device's location).

Figure 4C:
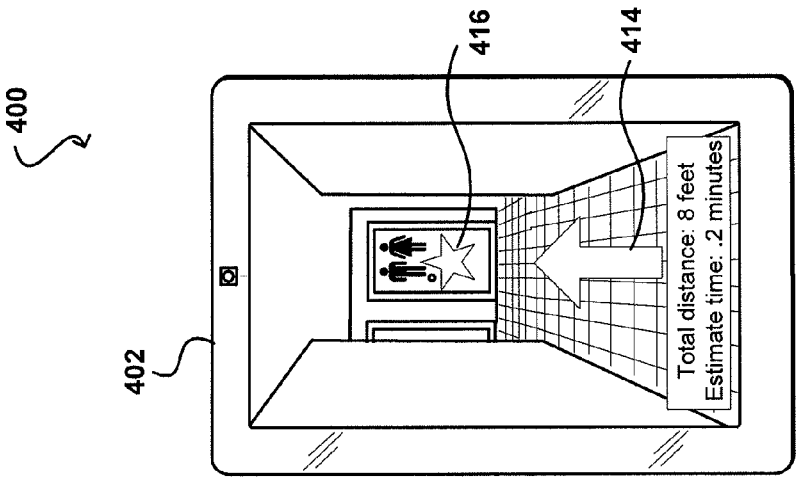
FIGS. 4(a)-4(c) illustrate an example situation of an electronic device displaying navigation information in guiding a user to a particular location in accordance with various embodiments.
Figure 4B:
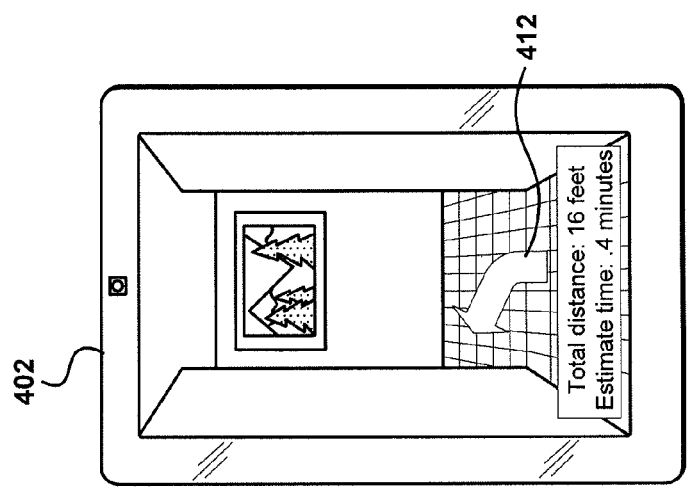
Figure 4A:
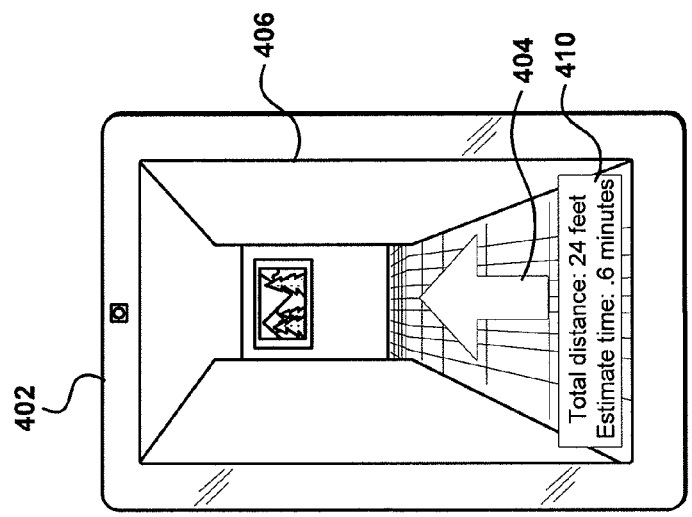

FIGS. 4(a)-4(c) illustrate an example situation 400 of an electronic device 402 displaying navigation information in guiding a user to a particular location. In some embodiments, the electronic device displays the navigation information in a two-dimensional bird's eye view. Some embodiments display the navigation information in a three-dimensional view, using the images captured from one or more image capturing elements of the device to present a virtual reality of the user's surroundings.

FIG. 4(a) illustrates that upon determining the route in which to guide the user, the electronic device 402 displays on a display element 406 of the device the initial direction toward which the user should go (e.g., via an arrow 404). In some embodiments, the device instructs the directions by displaying a symbol (e.g., an arrow, an animated bouncing ball) over the captured three-dimensional image of the user's surroundings. The symbol may point towards a particular direction in directing the user to proceed in the particular direction.

In this example, the user has selected to have the device direct the user to the restroom within the shortest distance. After determining the user's location and the restroom within the shortest distance from the user's current location, the device of some embodiments displays an overview of the route toward which the device will navigate the user. Other information 410 may also be displayed, such as the total distance between the user's location and the target location, the estimated time it may take the user (e.g., by foot, by car, by train, or a combination of different manners of transportation), etc. Some embodiments may skip this step and start the navigation.

FIG. 4(b) illustrates that upon detecting that the user has made a movement, the device 402 displays the next instructional step (e.g., via a directive arrow 412). Some embodiments continually check whether the user has made a movement by continually updating the position of the user and then comparing the updated position with the previous position. In some embodiments, the device displays the next instructional step by displaying another symbol. In some instances, the device may display text or other types of information (e.g., an animation effect such as a rolling coin) that may direct the user toward a particular direction.

In this example, the device 402 determines that the user's position has changed and depending on the user's current position, the device displays another arrow 412 to show the user what direction to proceed in order to reach the target destination. By holding up the device, the user may continue to follow the directions given by the device. In this case, the device directs the user to make a left at the corner.

FIG. 4(c) illustrates that upon directing the user to around the corner, the device 402 displays another symbol 414 directing the user to the target destination. Some embodiments display another symbol 410 to indicate that the final destination is within sight. Here, the symbol indicating the target destination is shown by a star 416, indicating that this is the location that the user for which the user had specified to be directed. In addition to using mapping information to determine directions for a user of the device, the device may provide directional guidance by taking additional factors into account. For example, the device may determine a best path for a user while shopping in a grocery store by assessing the user's shopping list in addition to the mapping information received from the grocery store itself (e.g., through broadcast, through downloading from the grocery store's website, etc.).

Figure 5:
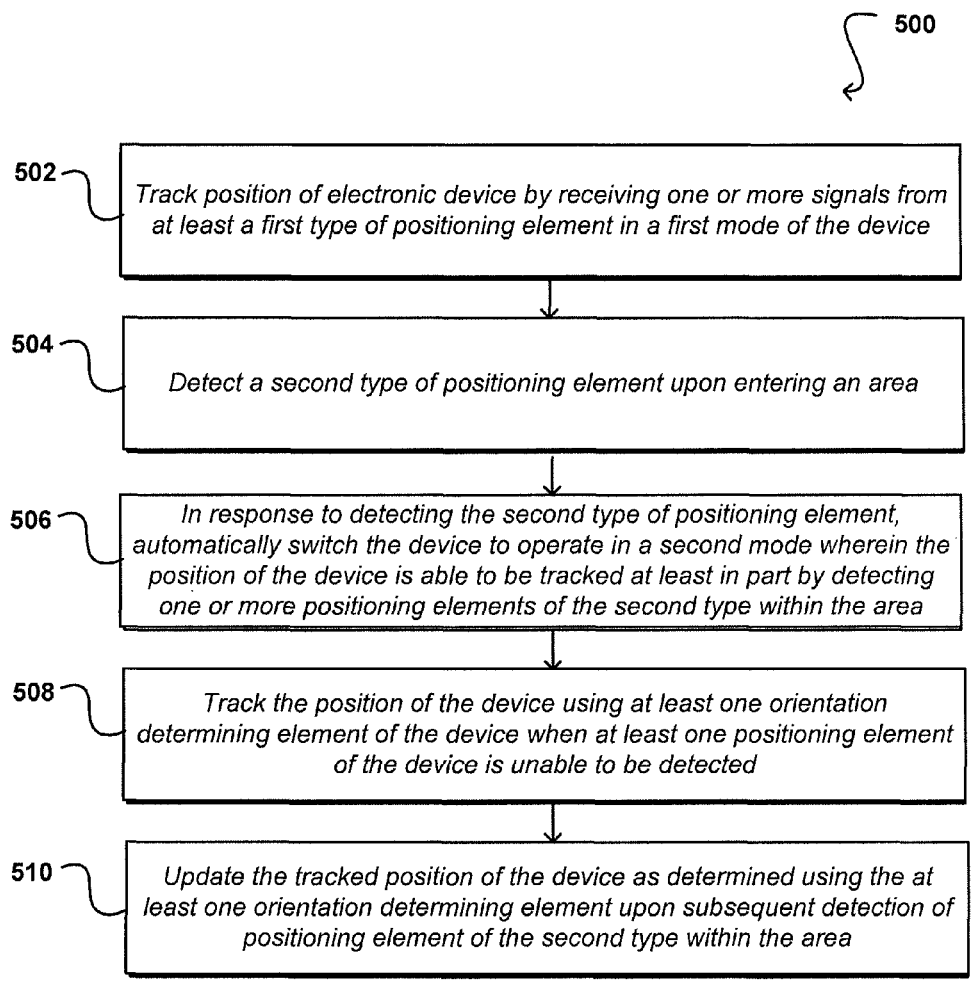
FIG. 5 illustrates an example process for determining the location of a user by determining the position of the user's mobile device in accordance with various embodiments.

FIG. 5 illustrates an example process 500 for determining the location of a user by determining the position of the user's mobile device in accordance with various embodiments. It should be understood for the various processes discussed herein that there can be additional, fewer, or alternative steps performed in similar or alternative orders, or in parallel, within the scope of the various embodiments unless otherwise stated.

Some embodiments keep track of the user's location in order to provide accurate and updated directions to a target location for the user. In one instance, the device of some embodiments may, as the user moves, update the user the amount of time needed before the user reaches the desired destination. In another instance, the device may reroute the user when the device detects that the user has gone off its given course.

In some instances, using an electronic device's GPS is not accurate enough to determine the user's position within certain locations, such as when the user is indoor or in high-density urban areas. The device of some embodiments may use other or additional mechanisms (e.g., detection of indoor wireless access point signals, scanning of QR codes) to accurately determine the user's position.

FIG. 5 illustrates an example process performed by a user's electronic device (e.g., a smartphone). In this example, the position of the device is tracked by receiving one or more signals (e.g., GPS signals) from at least a first type of positioning element (e.g., GPS) in a first mode (e.g., outdoor mode) of the device 502. Some embodiments use a device's GPS to determine the location of a mobile device. In widespread areas and outdoor locations, using the device's GPS is often enough for determining the user's approximate location. For example, the device may determine which entrance (e.g., south, east, north, west) the user took to enter a particular building by using the device's GPS. In some instances, the mobile device may receive other types of signals such as cellular signals (e.g., from cellular base stations) and Wi-Fi signals (e.g., from wireless access points) in determining the mobile device's position (e.g., by signal triangulation methods).

A second type of positioning element may be detected upon entering a particular area 504. Some embodiments enable the mobile device to detect a positioning element (e.g., wireless access point(s), QR code(s), RFID tag(s), femtocell(s), wireless router(s), NFC tag(s)) upon entering an area (e.g., a building, a company, a shopping center, a school). For instance, upon entering a shopping center or a supermarket, the user may cause the device to contact a near field communication (NFC) device or an NFC tag, cause the device to scan a QR code, cause the device to receive an RFID signal, cause the device to receive a signal from an access point, etc. One of ordinary skill would recognize that the positioning element detected by the device may be elements other than QR codes, wireless access points, etc. that can perform data exchange with the user's electronic device.

In response to detecting the second type of positioning element, the electronic device may be automatically switched to operate in a second mode wherein the position of the device is able to be tracked at least in part by detecting one or more positioning elements of the second type within the area 506. As mentioned above, the second positioning element of some embodiments may be a wireless access point, a QR code, an RFID tag, etc. The electronic device may be automatically switched to operate in a different mode (e.g., an indoor mode, a city mode, a walking mode) upon detecting the second type of positioning element.

Some embodiments pre-configure the device such that the device may recognize and distinguish between the different types of positioning elements. The device of some embodiments may operate in a different mode when different positioning elements are detected. Some embodiments determine the type of mode to operate upon detection of a certain type of positioning element using a pre-configured lookup table. In some embodiments, the user may configure the device to switch to a different mode upon detection of a particular signal or may specify a ranking of types of positioning elements in an order of the user's preference.

Some embodiments track the position of the electronic device by detecting one or more positioning elements of the second type within the area. The positioning elements may enable the device to obtain various information (e.g., location information, map information) regarding the device's current location. For instance, the device may determine its location by triangulating signals from multiple access points. In another instance, the device may receive an identifier by receiving an RFID signal from an RFID tag at a particular location and then be able to map the identifier to location information. Other instances include enabling the device to obtain its coordinates by scanning a QR code.

In this example, the position of the device is tracked using at least one orientation determining element of the device when at least one positioning element of the device is unable to be detected 508. In some instances, the device uses orientation determining elements of the device, such as accelerometers, electronic gyroscopes, electronic compasses, motion sensors, level sensors, etc., to track the position of the device or make some type of determination relating to at least one of a position, orientation, and movement of the device. Some embodiments enable the device to use a combination of one or more orientation determining elements of the device and one or more positioning elements in the environment to determine the position of the device.

Further, in some embodiments, an orientation determining element of the device may be a video recognition component of the device. Recognizing objects, locations, persons in one or more captured images (e.g., still or video images) enables the device of some embodiments to determine location information for the device. In instances where at least one positioning element is unable to be detected (e.g., due to being in an area with little reception), the device may activate and/or utilize at least one orientation determining element of the device to track the position of the device or estimate the location of the device from an initial starting point.

The tracked position of the device as determined using the at least one orientation determining element is updated upon subsequent detection of positioning element of the second type within the area 510. Some embodiments may update the tracked position of the device using one or more positioning elements in order to adjust for drift and other errors. In some embodiments, the estimated location error increases as the user continues to use orientation determining elements such as accelerometers and gyroscopes of the device to keep track of the device's movement. As mentioned above, positioning elements may include QR codes, RFID, wireless access points (e.g., other mobile devices), etc. Upon detecting position elements of the second type (e.g., as configured by a user or pre-configured by a manufacturer), the tracked position of the device may be updated to a more accurate location.

Figure 6:
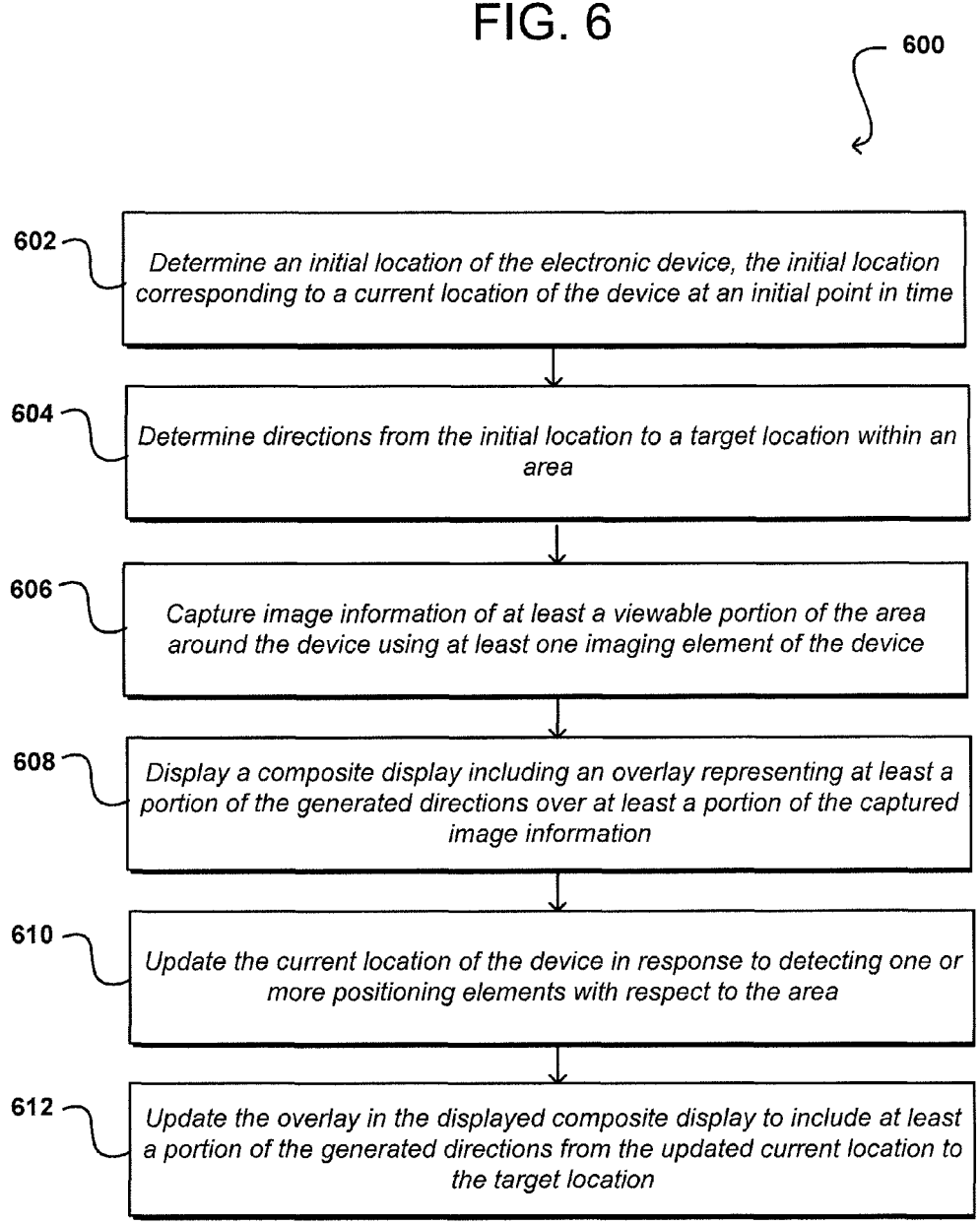
FIG. 6 illustrates an example process of enabling an electronic device to provide directions to a user through a display element of the device in accordance with various embodiments.

FIG. 6 illustrates an example process 600 of enabling an electronic device to provide directions to a user through a display element of the device. It should be understood that other types of information can be displayed as well. In this example, an initial location of the electronic device is determined where the initial location corresponds to a current location of the electronic device at an initial point in time 602. Some embodiments determine the initial location of the device upon receiving a request for directions to a particular location. The initial location of the device may be determined using various mechanisms, such as GPS on the device, signal strength triangulation, scanning a QR code, etc.

Directions from the initial location to a target location within an area is determined 604. In some embodiments, the device may determine one or more routes from the initial location to the target location using mapping information. As described above, mapping information for an area may include location information of objects or persons within the area. For instance, mapping information for a shopping center may include information on where a consumer can find a certain item, the location of the individual stores, etc. In another instance, mapping information for an office building may include information on where each person's cubicle is located, the location of the bathrooms and conference rooms, etc. In addition to location information, mapping information of some embodiments may also include other information regarding the objects and persons within the area, such as general information on the objects and background profiles of persons. In some embodiments, the device may present a number of routes to a user. The user may then select a desired route from the multiple routes.

Then, image information of at least a viewable portion of the area around the device may be captured using at least one imaging element of the device 606. The at least one imaging element of the device (e.g., a camera of a smartphone) may capture images over a wide range of angles, such as 180° or more of the environment around the device. Some embodiments may capture image information using the side cameras of a device, the back camera(s) of the device, or a combination of cameras situated differently on the device to capture different angles of the environment. In some embodiments, the image information may be captured by other imaging elements of the device in addition to or other than the cameras of the device. In some embodiments, the image information may be captured by imaging elements of other devices, which may be mobile devices in the area and/or fixed-location imaging devices which make the image information available.

Moreover, the image information may include still or video images in some embodiments. In some embodiments, the device may construct a three-dimensional image simulating the user's current environment (e.g., a virtual reality of the user's current environment) using the captured image information. Some embodiments enable the device to use the mapping information in conjunction with the image information in constructing the virtual reality for display on the display element of the device.

A composite display including an overlay representing at least a portion of the generated directions over at least a portion of the captured image information may be displayed 608. The device of some embodiments may display, on a display element (e.g., display screen) of the device, a composite display that directs the user to the desired location. The overlay may be a symbol (e.g., an arrow), a text, and/or an animated effect (e.g., a bouncing ball, animated representation of a person or creature, etc.) that direct the user toward a particular direction. As mentioned, some embodiments display the captured imaged information of the user's environment in a three-dimensional view on the display screen of the device. Displaying an overlay (e.g., an arrow) that represents at least a portion of the generated directions (e.g., the next turn, the next move) enables the user to follow the directions in an intuitive manner that may be easily understood.

In this example, the current location of the device is updated in response to detecting one or more positioning elements with respect to the area 610. Upon detecting one or more positioning elements, such as access points, QR codes, NFC tags, etc., the device of some embodiments may update the current location of the device. As the user moves from the initial location toward a direction, the current location of the device changes. In order to provide the user with updated directions (e.g., the amount of time still needed to reach the destination, the distance between the user and the destination), the device of some embodiments must keep track of the user's current position. Moreover, the device may keep track of the device's current location so that the device may inform the user when the user has gone off course.

The overlay in the displayed composite display is updated to include at least a portion of the generated directions from the updated current location to the target location 612. As the user progresses towards a certain direction indicated through the overlay, the device of some embodiments updates the overlay that includes at least a portion of the generated direction based on the user's current position. The portion of the generated direction may be a portion that indicates to the user to go straight for 30 ft or a portion of the directions that indicate to the user to take a right turn at a corner, etc.

The overlay is updated to provide an interactive and intuitive display to the user in directing the user toward a particular location. In some embodiments, the overlay may display information other than directional guidance, such as information regarding a specific item or person that is captured in the background. As mentioned, the device of some embodiments may utilize the mapping information that includes information about objects, persons, and/or locations within the area to display additional information about those objects, persons, and/or locations within the captured images.

Figure 7:
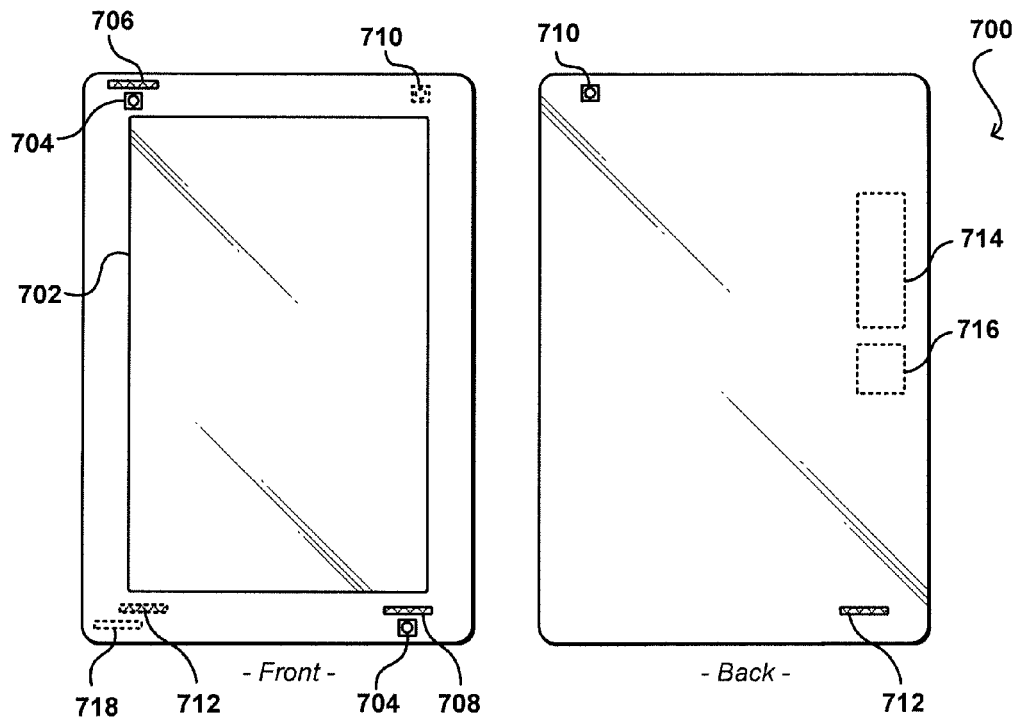
FIG. 7 illustrates front and back views of an example electronic device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
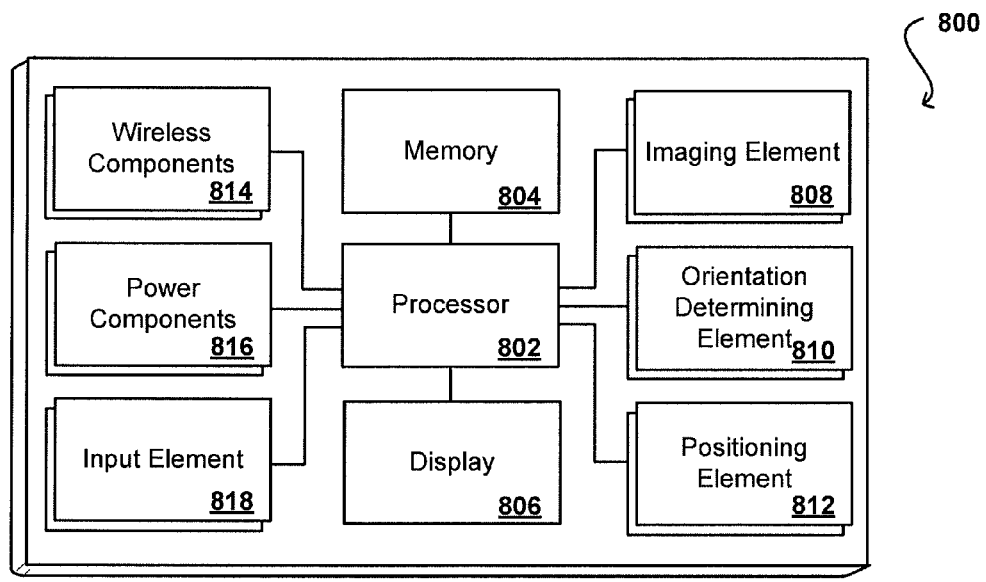
FIG. 8 illustrates a set of basic components of an electronic device such as the device described with respect to FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 9:
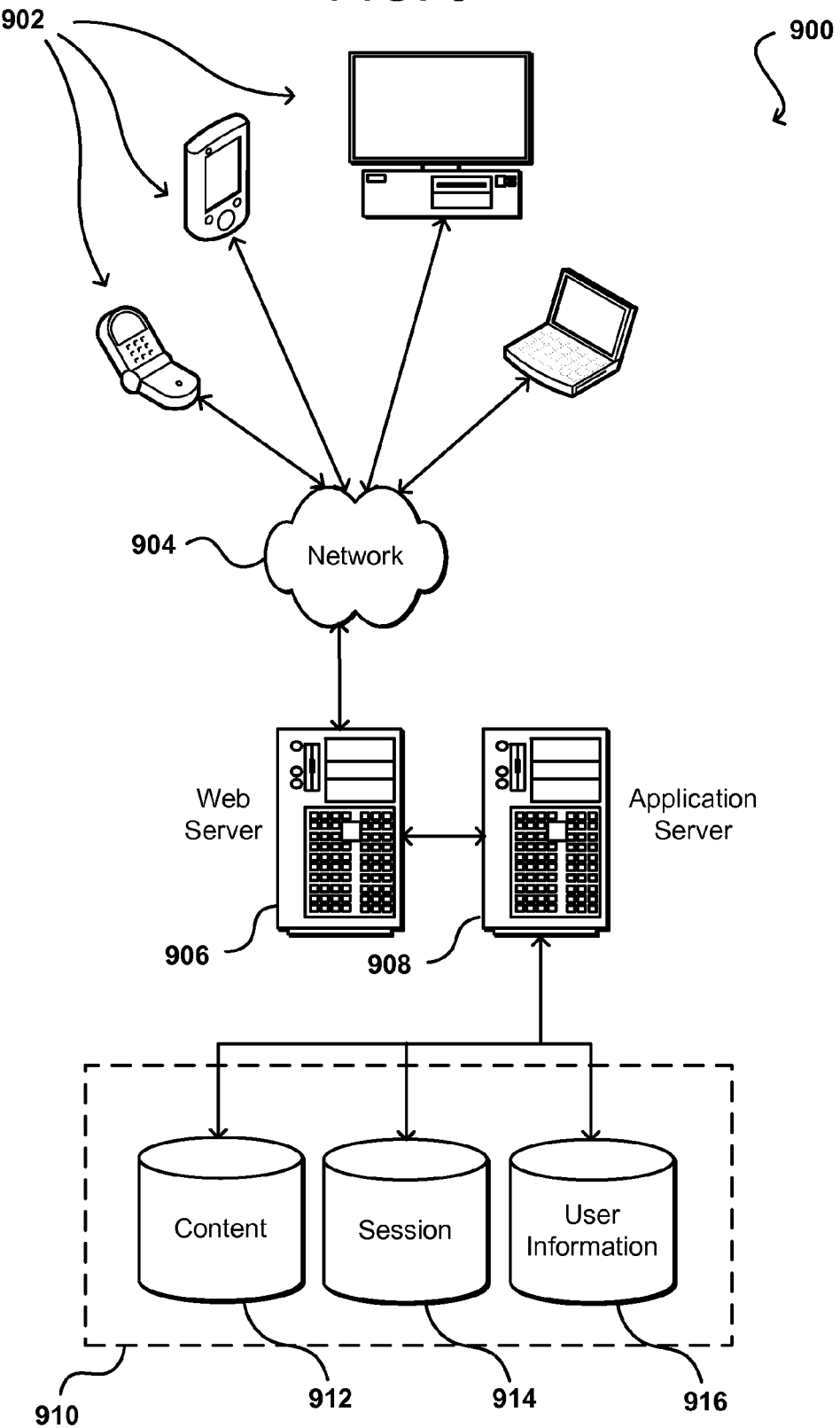
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining a position of a mobile device in a particular area, the method comprising:
   in a first mode of the mobile device, tracking the position of the mobile device by receiving one or more signals from at least a first type of positioning element;
   detecting a second type of positioning element upon entering the particular area;
   in response to detecting the second type of positioning element, automatically switching the mobile device to operate in a second mode wherein the position of the mobile device is able to be tracked at least in part by detecting one or more positioning elements of the second type within the particular area;
   tracking the position of the mobile device using at least one orientation determining element of the mobile device when at least one positioning element of the mobile device is unable to be detected; and updating the tracked position of the mobile device as determined using the at least one orientation determining element upon subsequent detection of positioning element of the second type within the particular area.

2. The method of claim 1 further comprising correcting the position of the mobile device using at least one of the orientation determining element or the second type of positioning element.

3. The method of claim 1, wherein the first mode is an outdoor mode and a second mode is an indoor mode.

4. The method of claim 1, wherein the one or more signals is at least one of a GPS signal, a cellular signal, a Wi-Fi signal, a base station signal, or a Bluetooth® signal.

5. The method of claim 1, wherein the first type of positioning element is at least one of a UPS, a cellular base station, or a wireless access point, the second type of positioning element is at least one of a QR code, a femtocell, a wireless router, an RFID tag, an NFC tag, or an image recognition element, and the orientation determining element is at least one of an accelerometer, an electronic gyroscope, an electronic compass, or a signal strength detector, wherein the first positioning element, the second positioning element, and the orientation determining element provide information that enable the mobile device to determine a current position of the mobile device.

6. The method of claim 1 further comprising displaying a map that indicates the position of the mobile device as the position is updated in real-time.

7. The method of claim 1 further comprising:
receiving a request for directions to a target location within the particular area;
capturing at least one image of an area around the mobile device;
generating directions from the updated position of the mobile device to the target location; and
displaying an overlay over the captured images, the overlay including a portion of the generated directions.

8. A method of enabling an electronic device to provide directional guidance, the method comprising:
determining an initial location of the electronic device, the initial location corresponding to a current location of the electronic device at an initial point in time;
determining directions from the initial location to a target location within an area;
capturing image information of at least a viewable portion of the area around the electronic device using at least one imaging element of the electronic device;
displaying a composite display including an overlay representing at least a portion of the generated directions over at least a portion of the captured image information;
updating the current location of the electronic device in response to detecting one or more positioning elements with respect to the area; and
updating the overlay in the displayed composite display to include at least a portion of the generated directions from the updated current location to the target location.

9. The method of claim 8 further comprising:
from a user of the electronic device, receiving a request for directions to the target location within the area.

10. The method of claim 8 further comprising:
obtaining mapping information for the area, the mapping information including location data for a plurality of items in the area and additional information relating to the plurality of items, wherein determining the directions includes using the mapping information to obtain one or more routes between the initial location and the target location.

11. The method of claim 8, wherein the image information comprises at least one of still images and video images.

12. The method of claim 8, wherein updating the current location of the electronic device comprises:
scanning the one or more positioning elements with respect to the area to obtain at least one identifier; and
mapping the at least one identifier to location information using a lookup table.

13. The method of claim 8, wherein the one or more positioning elements is detected over a sideband channel that is at least one of a wireless data channel, radio frequency channel, Bluetooth® channel, ultra wideband radio frequency channel, Wi-Fi channel, or infrared signaling channel.

14. The method of claim 8, wherein the one or more positioning elements is of a first type of positioning element, the method further comprises updating the current location by using a second type of positioning element different from the first type.

15. The method of claim 8, wherein the imaging element comprises at least one of an ambient light camera element or an infrared sensor.

16. The method of claim 8, wherein the one or more positioning elements is at least one of an RFID tag, an NFC tag, or a QR code.

17. The method of claim 8 further comprising:
upon detecting a movement of the electronic device, updating the composite display.

18. The method of claim 8, wherein the initial location of the electronic device is determined using GPS signals.

19. An electronic device, comprising:
a processor;
at least one imaging element;
at least one sideband communication mechanism; and
a memory device including instructions that, when executed by the processor, cause the computing device to:
determine an initial location of the electronic device, the initial location corresponding to a current location of the electronic device at an initial point in time;
determine directions from the initial location to a target location within an area;
capture image information of at least a viewable portion of the area around the electronic device using at least one imaging element of the electronic device;
display a composite display including an overlay representing at least a portion of the generated directions over at least a portion of the captured image information;
update the current location of the electronic device in response to detecting one or more positioning elements with respect to the area; and
update the overlay in the displayed composite display to include at least a portion of the generated directions from the updated current location to the target location.

20. The electronic device of claim 19, wherein the memory device further includes instructions that, when executed by the processor, cause the processor to:
detect a signal from at least a first type of positioning element; and
switch from detecting from at least the first type of positioning element to at least a second type of positioning element upon detecting a trigger.

21. The electronic device of claim 20, wherein detecting the trigger includes recognition of at least one of an object, a location, a QR code, an RFID tag, a Wi-Fi signal, or an NFC tag.

22. The electronic device of claim 19, wherein the memory device further includes instructions that, when executed by the processor, cause the processor to:
update the current location of the electronic device by using additional positioning elements that include at least one of an accelerometer, an electronic gyroscope, or an electronic compass.

23. The electronic device of claim 19, wherein the overlay comprises a symbol that instructs a user of the electronic device to proceed in a particular direction.

24. The electronic device of claim 23, wherein the symbol is at least one of an arrow, a text, or an animated visual cue.

25. The electronic device of claim 19, wherein the memory device further includes instructions that, when executed by the processor, cause the processor to:
detect an orientation of the electronic device; and
display a two-dimensional bird's eye view of the directions from the initial location to the target location when the detected orientation of the electronic device is below a threshold angle.

26. A non-transitory computer-readable storage medium storing a computing program for enabling an electronic device to provide information to a user of the electronic device, the computer program comprising sets of instructions that, when executed by a processor, cause the processor to:
in a first mode of the electronic device, track a position of the electronic device by receiving a first type of signal from a first positioning element;
detect a second positioning element upon entering a particular area;
in response to detecting the second positioning element, switch to a second mode that tracks the position of the electronic device by receiving a second type of signal from the second positioning element;
track the position of the electronic device using at least one of a third positioning element and an orientation determining element of the electronic device; and
upon detection of a fourth positioning element, update the position of the electronic device.

27. The non-transitory computer-readable storage medium of claim 26, wherein the first mode is outdoor mode, the second mode is indoor mode, the first type of signal is at least one of a GPS signal, a cellular signal, or a Wi-Fi signal, and the second type of signal is at least one of a base station signal, a Bluetooth® signal, or a Wi-Fi signal.

28. The non-transitory computer-readable storage medium of claim 26, wherein the sets of instructions when executed further cause the processor to:
receive a request for directions to a target location within the particular area;
capture at least one image of an area around the electronic device;
generate directions from the updated position of the electronic device to the target location; and
display an overlay including a portion of the generated directions over the captured images.

* * * * *

UNITED STATES PATENT AND TRADEMARK OFFICE
CERTIFICATE OF CORRECTION

| | | |
|---|---|---|
| PATENT NO. | : 8,624,725 B1 | |
| APPLICATION NO. | : 13/241031 | |
| DATED | : January 7, 2014 | |
| INVENTOR(S) | : Christopher S. A. MacGregor | |

It is certified that error appears in the above-identified patent and that said Letters Patent is hereby corrected as shown below:

In the claims:

Claim 5, column 21, line 15, delete "UPS"

and insert --GPS--

Signed and Sealed this
Fourth Day of March, 2014

Michelle K. Lee
*Deputy Director of the United States Patent and Trademark Office*